Nov. 9, 1926.
M. E. EDWARDS
TESTING METER FOR RADIO SETS
Filed July 22, 1924
1,606,063
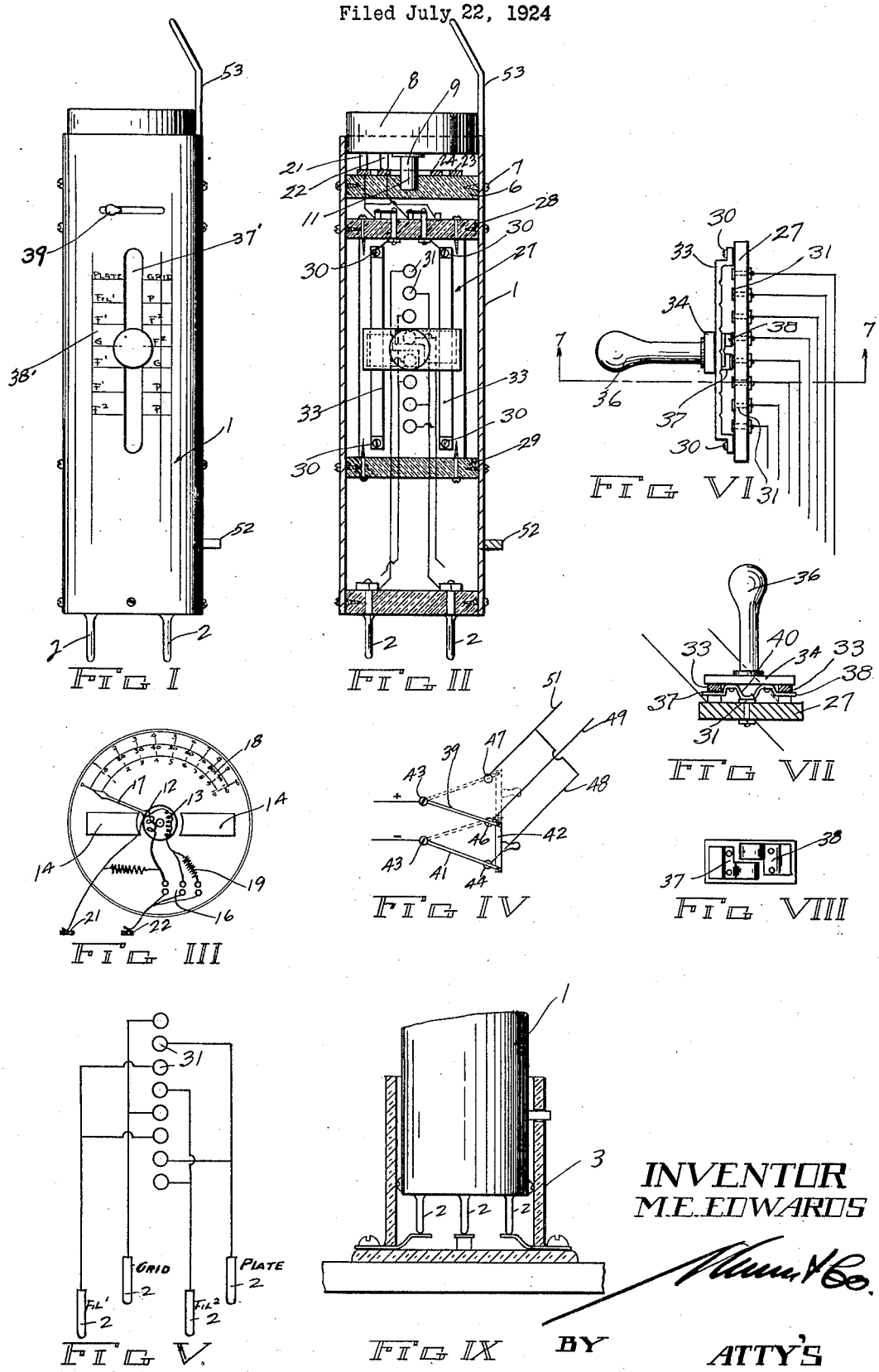
INVENTOR
M. E. EDWARDS
BY ATTY'S Patented Nov. 9, 1926.

1,606,063

UNITED STATES PATENT OFFICE.

MASENA E. EDWARDS, OF SAN FRANCISCO, CALIFORNIA.

TESTING METER FOR RADIO SETS.

Application filed July 22, 1924. Serial No. 727,582.

This invention relates to improvement in testing meters for radio sets, and its particular object is to provide a meter such as a voltmeter or an ammeter or a meter connecting both features in a radio set in such a manner that the electric pressures between any two points of the socket contacts may be conveniently tested to ascertain whether the connections between the various elements of the radio set have been properly made.

It is particularly proposed in this connection to provide an element made in simulation of the socket end of the vacuum tube which may be inserted in the socket in the same manner as the vacuum tube and to provide a meter of the character described in connection with the said element. It is further proposed to secure the meter in such a manner that it faces upwardly and that it may be turned around so as to allow of a convenient reading of the dial. It is further proposed to provide electrical connections between the contacts of the element made in simulation of the four conventional prongs extending downwardly from the conventional vacuum tube and the terminals of the meter which allow electrical pressures between any two prongs to be read on the meter. Further objects and advantages of my invention will appear as the specification proceeds.

The preferred form of my invention is illustrated in the accompanying drawing in which Figure 1 shows a side elevation of my meter arrangement; Figure 2 a vertical section through the same; Figure 3, a diagram, illustrating the electrical connections in the meter; Figure 4, a diagram of a reversing switch used in my arrangement; Figure 5 a wiring diagram showing the electric connections around any two of the prongs to be connected to the meter; Figure 6 a detailed view of the sliding contact arrangement; Figure 7 a section taken along line 7—7 of Figure 6; Figure 8 a face view of a slide used in the arrangement shown in Figure 6, and Figure 9 an assembly view showing my device inserted in the socket of a wireless receiving set.

While I have shown only the preferred form of the invention, it should be understood that various changes or modifications may be made within the scope of the claims hereto attached without departing from the spirit of the invention.

In its preferred form my arrangement includes a tubular element 1 made of the same dimensions as the socket end of the vacuum tube in the place of which my device is to be used and provided with four prongs 2 extending downwardly therefrom to simulate the prongs extending from the vacuum tube used in the conventional radio hookup. When the tubular element 1 is inserted in the socket 3, as illustrated in Figure 9, the four prongs make contact with four contacts in the socket, the four contacts representing the two terminals of the tube filament, the terminal of the grid circuit and the terminal of the plate circuit respectively.

The tube element 1 is provided near its upper end with an insulating disc 6, which is held in place by means of suitable screws 7. A meter 8 made to fit into the tubular element has an axial stud 9 extending downwardly therefrom, which latter is received in a registering recess 11 in the disc allowing the meter to revolve on its support while the upper part of the meter projects beyond the tubular element. The meter may be made of any conventional form and is preferably arranged to indicate strength of current as well as voltage. For this purpose I provide in the conventional manner a low resistance coil 12 of Figure 3 and a high resistance coil 13 between the pole pieces 14 of a permanent magnet with a switch arrangement 16 allowing the current to be switched from one coil to the other causing the pointer 17 when sliding over the scale 18 to indicate either voltage or amperage. The switch 16 further allows a resistance 19 to be introduced for high voltage reading. All these features are well known in the art and are, therefore, not elaborated on. The two terminals 21 and 22 of the meter make sliding contact with two metallic rings 23 and 24, so that the meter may be revolved through a complete revolution without losing contact with the said two rings.

The latter are connected to the four prongs by the arrangement shown in Figure 2, which allows electrical connection to be established between the two rings and any desired combination of any two prongs. In this arrangement a mounting strip 27 is supported between the two insulating discs 28 and 29 supported in the tubular element 1 and has eight terminals 31 projecting from the surface thereof, the terminals being arranged in a row in the manner shown in the drawing. These eight terminals are connected to the four prongs 2 in the manner illustrated in Figure 5, the uppermost terminal being connected to the grid prong, the second to the plate prong, the third to the first filament prong, the fourth to the second filament prong, the fifth to the grid prong, the sixth to the first filament prong, the seventh to the plate prong, and the eighth to the second filament prong. On the opposite sides of this row of terminals I provide the metallic guide rods 33, arranged in parallel relation, each having its ends set off and secured to the mounting strip 27 by screws 30, so that the main portion of each guide-rod is spaced from the strip 27, the two rods are electrically connected with the two rings 23 and 24 through a reversing switch arrangement described hereinafter. A slide 34 provided with a handle 36 has two spring contacts 37 and 38 mounted thereon in such a manner that the guide rods 33 are confined between the slide and one end of a spring contact, while the other two ends of the spring contacts extend into contact with the terminals 31 in such a manner that they may be made to touch two successive terminals. The under sides of the guide-rods may be notched, as shown at 45, to create a tendency in the slide to stop when disposed over two contacts. By means of this arrangement any combination of any two of the four prongs 2 may be electrically connected to the meter through the rings 23 and 24 by sliding the slide 34 upwardly or downwardly on the guide rods 33. The handle 36 of the slide is made to extend through a slot 37' in the tubular element 1 and the latter may be scaled on the outside as shown at 38' to indicate what electrical connection is established in the various positions of the slide.

On top of the disc 28 within the tubular element 1, I provide the reversing switch 39, illustrated in detail in Figure 4. It is of conventional construction and includes two blades 41 connected by the cross piece 42 and hinged to the two terminals 43 in such a manner that its free end may be made to contact the two terminals 44 and 46, or the two terminals 46 and 47, the terminal 44 being connected to the terminal 47 by means of conductor 48.

It will be seen that when placed in the full line position of Figure 4 the current passes from the terminal 46 into the wire 49 and returns through the wire 48, while when placed in the dotted line position the current passes through the terminal 47 into the wire 51 and returns through the wire 49 whereby the current is reversed.

To use the device the tubular element 1 is inserted in the tube socket in the manner illustrated in Figure 9 so that the four prongs 2 engage with the four contacts in the socket. To insure a correct engagement of the prongs with the socket contacts a stud 52 may be provided on the tubular element which engages with the bayonet slot in the socket in the conventional manner. Next the switch arrangement 16 is set to provide ampere or high voltage or low voltage readings in accordance with the results desired. The meter may be revolved to allow of a convenient reading of same and in case the arrangement of the radio set does not allow of a convenient reading of the surface of the meter a mirror 53 may be provided in the manner shown in Figures 1 and 2 to facilitate the reading. The slide 34 may then be slid over the terminals 31 and readings be taken for each setting to determine whether the radio receiving set has been properly assembled. If desired the current passing through the meter may be reversed by means of reversing switch 39.

While my device has been described with reference to the tube socket of a radio set it should be understood that the principles involved may be applied to other sockets for electrical connections.

I claim:

1. A testing apparatus of the character described, comprising an element presenting more than two contacts at one end thereof, a meter associated with the outer end, guide-rods electrically connected to the terminals of the meter, a plurality of contact buttons electrically connected to the former contacts so that any two adjacent buttons connect to a different combination of contacts and a slide on the guid-rods arranged to ride over the buttons and to connect any two of them with the guide rods.

2. A testing apparatus of the character described, comprising an element presenting more than two contacts at one end thereof, a meter associated with the other end, two parallel guide rods electrically connected to the terminals of the meter, a row of contact buttons arranged between the rods and electrically connected to the former contacts so that any two neighboring buttons represent a different combination of the contacts and a slide on the guide rods arranged to ride over the buttons, and to connect any two of them to the guide rods.

3. A testing apparatus of the character described comprising a tubular element having more than two prongs projecting from the bottom thereof, a meter in the top of the element, two parallel guide rods within the element connected to the terminals of the meter, a row of contact buttons arranged between the rods and electrically connected to the prongs so that any two neighboring buttons represent a different combination of the prongs, and a slide on the guide rods arranged to ride over the buttons and to connect any two of them to the guide rods.

4. A testing apparatus of the character described, comprising an element presenting more than two contacts at one end thereof, a meter associated with the other end, a plurality of contact buttons electrically connected to the former contacts so that any two buttons represent a different combination of contacts and sliding means allowing each set of buttons to be connected to the terminals of the meter.

5. A testing apparatus of the character described, comprising an element presenting more than two contacts at one end thereof, a meter associated with the other end, a plurality of contact buttons electrically connected to the former contacts so that any two buttons represent a different combination of contacts and means for causing each set of buttons to be connected to the terminals of the meter, comprising a sliding element and a reversing element.

MASENA E. EDWARDS.